(12) United States Patent
Minegishi et al.

(10) Patent No.: US 6,436,000 B1
(45) Date of Patent: Aug. 20, 2002

(54) SHAFT COUPLING STRUCTURE WITH SPEED CHANGE FUNCTION

(75) Inventors: Kiyoji Minegishi, Chita-gun; Jun Tamenaga, Ohbu, both of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/678,380

(22) Filed: Oct. 3, 2000

(30) Foreign Application Priority Data

Oct. 4, 1999 (JP) .......................................... 11-283015

(51) Int. Cl.$^7$ .............................................. F16H 13/06
(52) U.S. Cl. ...................................... 475/183; 475/195
(58) Field of Search ................................ 475/183, 184, 475/185

(56) References Cited

U.S. PATENT DOCUMENTS

| | | | |
|---|---|---|---|
| 4,302,988 A | * 12/1981 | Takahashi et al. | 74/798 |
| 4,465,162 A | * 8/1984 | Yokota | 187/29 R |
| 4,483,216 A | * 11/1984 | Takahashi et al. | 74/798 |
| 4,648,288 A | * 3/1987 | Kato et al. | 74/798 |
| 5,037,361 A | * 8/1991 | Takahashi | 475/195 |
| 5,851,163 A | * 12/1998 | Kawase et al. | 475/183 |

* cited by examiner

Primary Examiner—Sherry Estremsky
Assistant Examiner—Tisha D. Lewis
(74) Attorney, Agent, or Firm—Arent Fox Kintner Plotkin & Kahn (57) ABSTRACT

A shaft coupling structure configured to maintain and exert inherent functions as well as to utilize surrounding empty space unused to provide its own speed change function. The shaft coupling structure includes a first shaft and a second shaft coaxially opposed to each other, and a member having a shaft insertion hole to which the first shaft and the second shaft are inserted at the vicinities of their shaft ends, rotational power transmission between the shafts being effected by the member. The member is divided into first-shaft side and second-shaft side so as to form a first transmission member and a second transmission member, respectively. A plurality of planetary rollers and a ring roller are arranged around the first transmission member. The plurality of planetary rollers making rolling contact with the inner periphery of the ring roller. The ring roller is engaged with an external non-rotational member for rotational restraint. Moreover, the second transmission member is configured to support the plurality of planetary rollers rotatably. Then, the second transmission member makes rotation integral with the revolution of the planetary rollers around the first transmission member.

6 Claims, 11 Drawing Sheets

FIG.11
PROIR ART

SHAFT COUPLING STRUCTURE WITH SPEED CHANGE FUNCTION

BACKGROUND OF THE INVENTION

1. Field of the Invention

The invention relates to a shaft coupling structure for coupling two rotating shafts coaxially opposed to each other to transmit rotational power from one of the rotating shafts to the other.

2. Description of the Related Art

A rotating shaft for power transmission sometimes cannot be made long because of material measurements, overhauls, and the like. In such cases, shaft division is required, and a shaft coupling is widely used as a machine element for coupling the two shafts divided.

Figure 9:
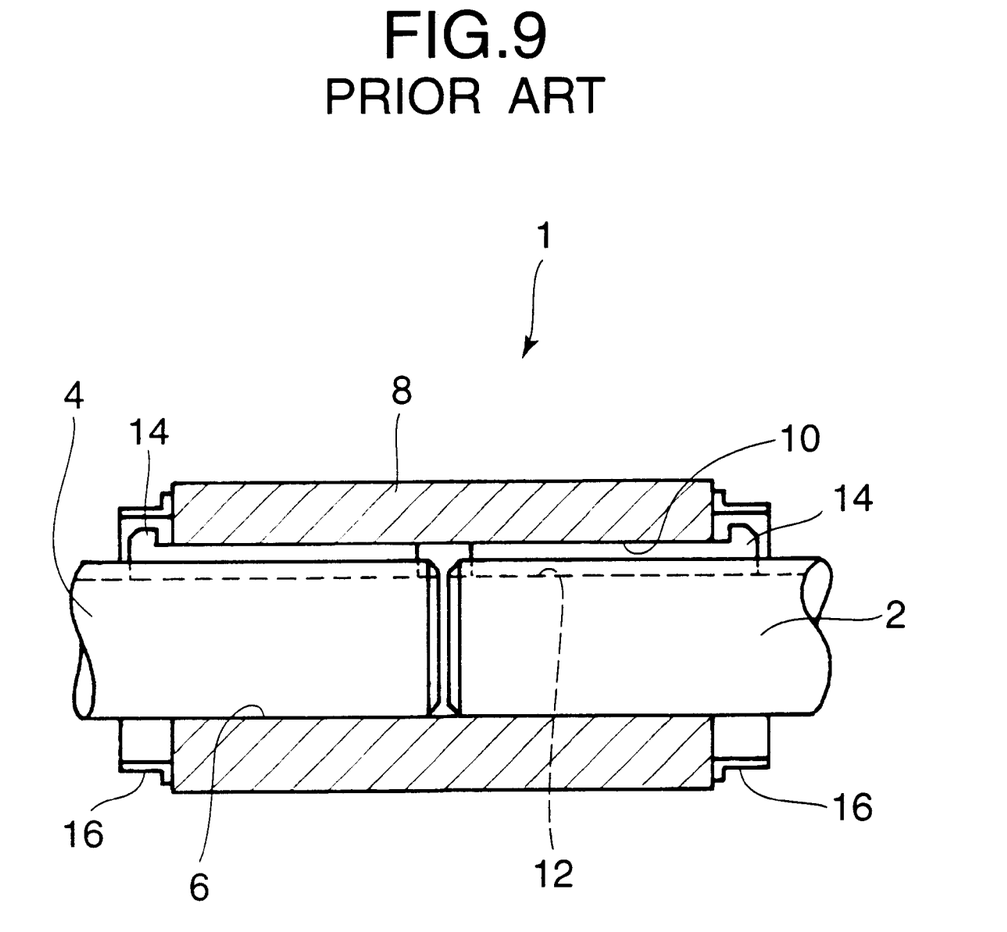
FIG. 9 is a partially sectional view showing a conventional shaft coupling structure.

FIG. 9 shows a shaft coupling structure 1 in wide use heretofore. In this shaft coupling structure 1, a first shaft 2 and a second shaft 4 for rotational power transmission are coaxially opposed to each other. The rotational power transmission between the first shaft 2 and the second shaft 4 is effected by a column-like member 8 having a shaft insertion hole 6 formed inside, to which the first shaft 2 and the second shaft 4 are inserted at the vicinities of their shaft ends.

To be more specific, the shaft insertion hole 6 is formed through the interior of the column-like member 8, and hence the column-like member 8 actually has the shape of a cylinder. This shaft insertion hole 6 has a key slot 10 formed therein. Similarly, the first shaft 2 and the second shaft 4 each are provided with a key slot 12. Accordingly, the first and second shafts 2 and 4 are individually engaged with the column-like member 8 in the direction of rotation via driving keys 14.

Here, safety covers 16 of short cylindrical shape are mounted on both sides of the column-like member 8 so that the heads of the driving keys 14 are prevented from exposure to exterior.

In this shaft coupling structure 1, the first shaft 2 and the second shaft 4 are coupled to each other in the direction of rotation via the column-like member 8. Therefore, for example, rotational power input to the first shaft 2 is transmitted through the driving keys 14 and the column-like member 8 to the second shaft 4 with the same rotational speed.

While this shaft coupling structure 1 has been described with the case where the shaft insertion hole 6 is formed through the interior of the column-like member 8, two shaft insertion holes may be independently formed in both ends of a column-like member 8 so as not to pass through.

Now, referring to FIG. 10, description will be given of another shaft coupling structure 20 in wide use here to fore. This shaft coupling structure 20 is of flange type. Here, a first shaft 2 and a second shaft 4 are coaxially opposed to each other. The rotational power transmission between the first shaft 2 and the second shaft 4 is effected by a first column-like member 22 having a shaft insertion hole 23 formed inside, to which the first shaft 2 is inserted at the vicinity of its shaft end, and a second column-like member 24 having a shaft insertion hole 25 formed inside, to which the second shaft 4 is inserted at the vicinity of its shaft end.

Specifically, the first and second column-like members 22 and 24 have a first flange portion 22A and a second flange portion 24A, both spreading radially outward, formed integrally on their opposing sides (the shaft-end sides of the first and second shafts 2 and 4),respectively. Each of the flange portions 22A and 24A has a plurality of bolt holes 26 formed there through along the direction of the center axis L, at regular intervals along the circumferential direction.

The first shaft 2 and the shaft insertion hole 23 in the first column-like member 22 are provided with key slots 10 and 12, respectively, so that they are engaged with each other in the direction of rotation via a parallel key 28. The second shaft 4 and the second column-like member 24 are in the same relationship.

The first flange portion 22A and the second flange portion 24A are coupled to each other by bolts 30 inserted through the bolt holes 26 and nuts 32 threadedly engaged with the bolts 30, so that the flange portions 22A and 24A make integral rotation.

Therefore, for example, rotational power input to the first shaft 2 is transmitted through the parallel key 28, the first column-like member 22, the bolts 30 and nuts 32, the second flange portion 24A, and the parallel key 28 in this order, to the second shaft 4 with the same rotational speed.

Here, though separate in form, the first column-like member 22 and the second column-like member 24 are substantially in an integral structure due to the bolts 30 and the nuts 32, much the same as the shaft coupling structure 1 shown in FIG. 9. Note that this shaft coupling structure 20 of flange type is particularly convenient when the first shaft 2 and the second shaft 4 have different shaft diameters, since the first column-like member 22 and the second column-like member 24 can be made of different members.

Next, description will be given of an example where the shaft coupling structure 1 shown in FIG. 9 is applied to a driving apparatus for a rotary machine.

Figure 11:
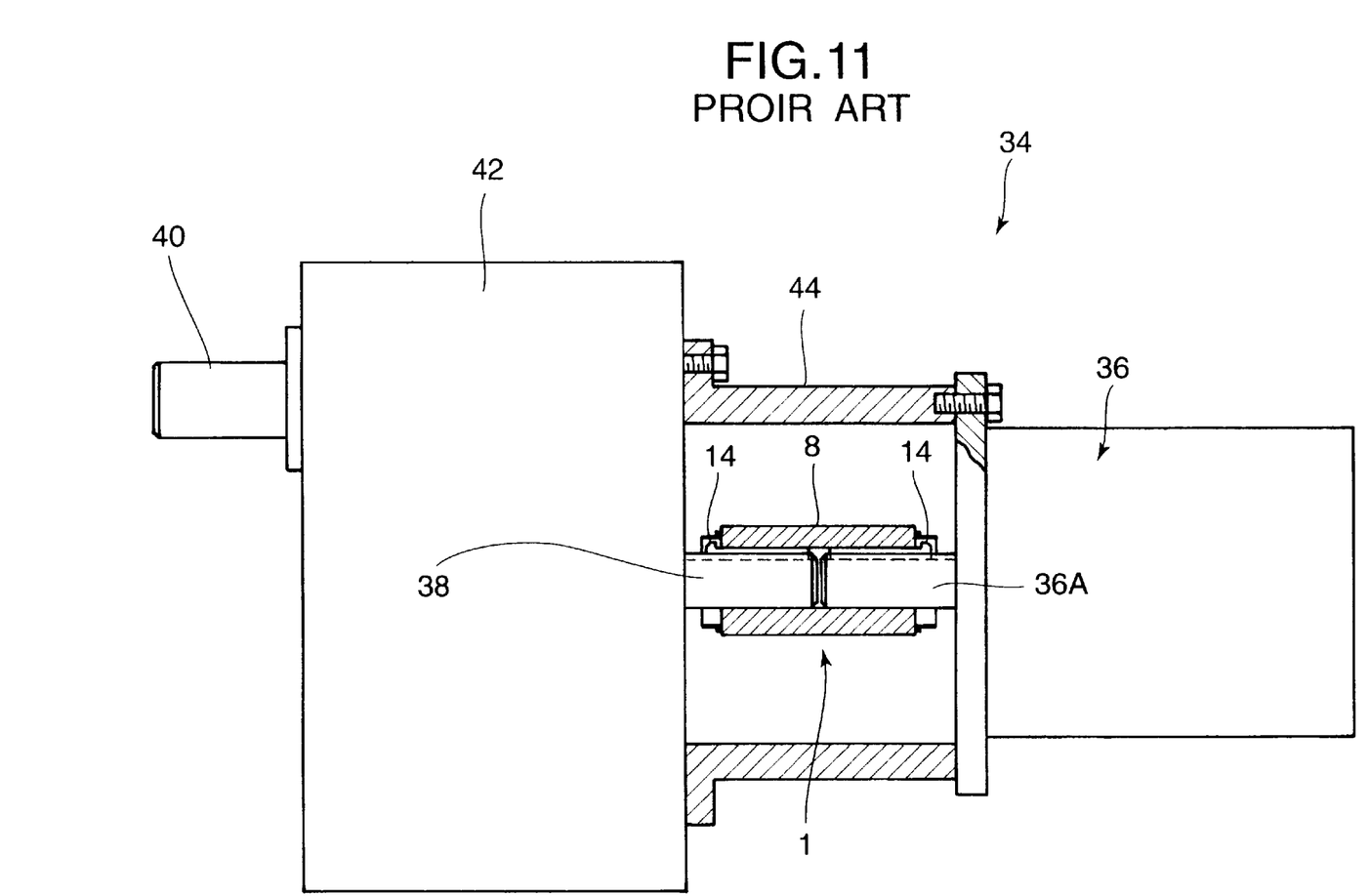
FIG. 11 is a partially sectional view of a rotary-machine driving apparatus to which a conventional shaft coupling structure is applied.

A rotary-machine driving apparatus 34 shown in FIG. 11 comprises a motor 36 having a motor shaft 36A, a speed reducer 42 having an input shaft 38 and an output shaft 40 in parallel, and a joint casing 44 for combining the motor 36 and the speed reducer 42 integrally. Here, the same shaft coupling structure 1 as that shown in FIG. 9 is used to couple the motor shaft 36A and the input shaft 38 to each other.

That is, turning to the relation between FIGS. 9 and 11, the first shaft 2 corresponds to the motor shaft 36A, and the second shaft 4 to the input shaft 38. Rotational power from the motor shaft 36A is thus transmitted through this shaft coupling structure 1 to the input shaft 38 with the same rotational speed.

The role of the joint casing 44 is to couple the motor 36 and the speed reducer 42 integrally so as not to make relative rotations. The joint casing 44 typically uses a circular cylindrical or square cylindrical member. In this connection, while this driving apparatus 34 has a structure of mounting the motor 36 directly onto the speed reducer 42 via the joint casing 44, the motor 36 and the speed reducer 42 may be separately fixed to an independent motor base, speed-reducer base, and the like. In such a case, a safety cover and the like may be installed to prevent the shaft coupling structure 1 from exposure.

Note that a shaft coupling structure sometimes functions to avoid a breakage of apparatuses to be connected. Suppose, for example, that the rotation of the speed reducer 42 in FIG. 11 is suddenly locked in an accident. Even so, the column-like member 8, the driving keys 14, or other components in the shaft coupling structure 1 can break down first to avoid an overload on the motor 36 and the like.

Nevertheless, as is evident from FIG. 11, there is plenty of room around the shaft coupling structure 1 (including the internal space of the joint casing 44 and the joint casing 44 itself) which has not been put into any use at all.

The reason for this is that the motor 36, the speed reducer 42, and other apparatuses having rotating shafts (input shaft 38, motor shaft 36A) has certain dimensions while the shaft coupling structure 1 for coupling the rotating shafts has highly compact configuration. That is, the space between the apparatuses arranged on both sides of the shaft coupling structure 1 actually has had no particular uses beneficial, other than to arrange a simple joint casing 44 or to install a safety cover over the shaft coupling structure 1 at best.

On the contrary, if the space described above is utilized, such utilization as involves an axial extension of the shaft coupling structure 1 and/or production of greater noise would be nothing more than confusion even in terms of shaft coupling functions.

SUMMARY OF THE INVENTION

The present invention has been achieved in view of the foregoing problems. It is thus an object of the present invention to provide a shaft coupling structure which maintains and exerts the functions inherent to a shaft coupling structure as well as utilizes the empty space around the to-be-coupled two shafts for an additional speed change function.

The foregoing object of the present invention has been achieved by the provision of a shaft coupling structure with speed change function comprising a first shaft and a second shaft coaxially opposed to each other, and a member for coupling the first shaft and the second shaft to each other, rotational power transmission between the first shaft and the second shaft being effected by the member. Here, the member is divided into first-shaft side and second-shaft side so as to form a first transmission member and a second transmission member for making integral rotation with the first and second shafts, respectively. A plurality of planetary rollers and a ring roller are arranged around the first transmission member. The plurality of planetary rollers make rolling contact with the outer periphery of the first transmission member and with the inner periphery of the ring roller, and the ring roller is engaged with a non-rotational member for rotational restraint. The second transmission member supports the plurality of planetary rollers rotatably so that the second transmission member makes rotation integral with the revolution of the plurality of planetary rollers around the first transmission member.

Figure 1:
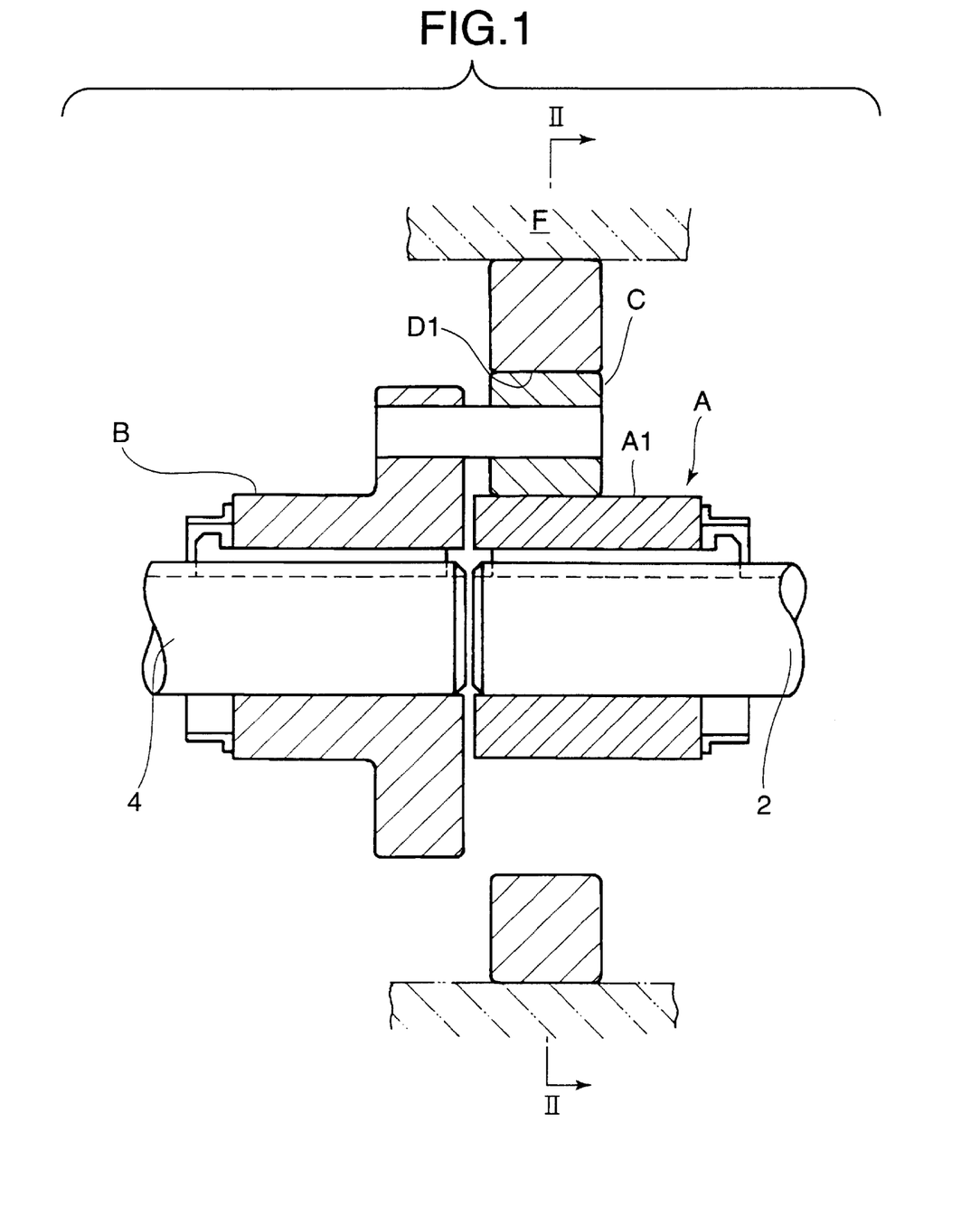
FIG. 1 is a conceptual diagram showing a shaft coupling structure according to the present invention.
Figure 2:
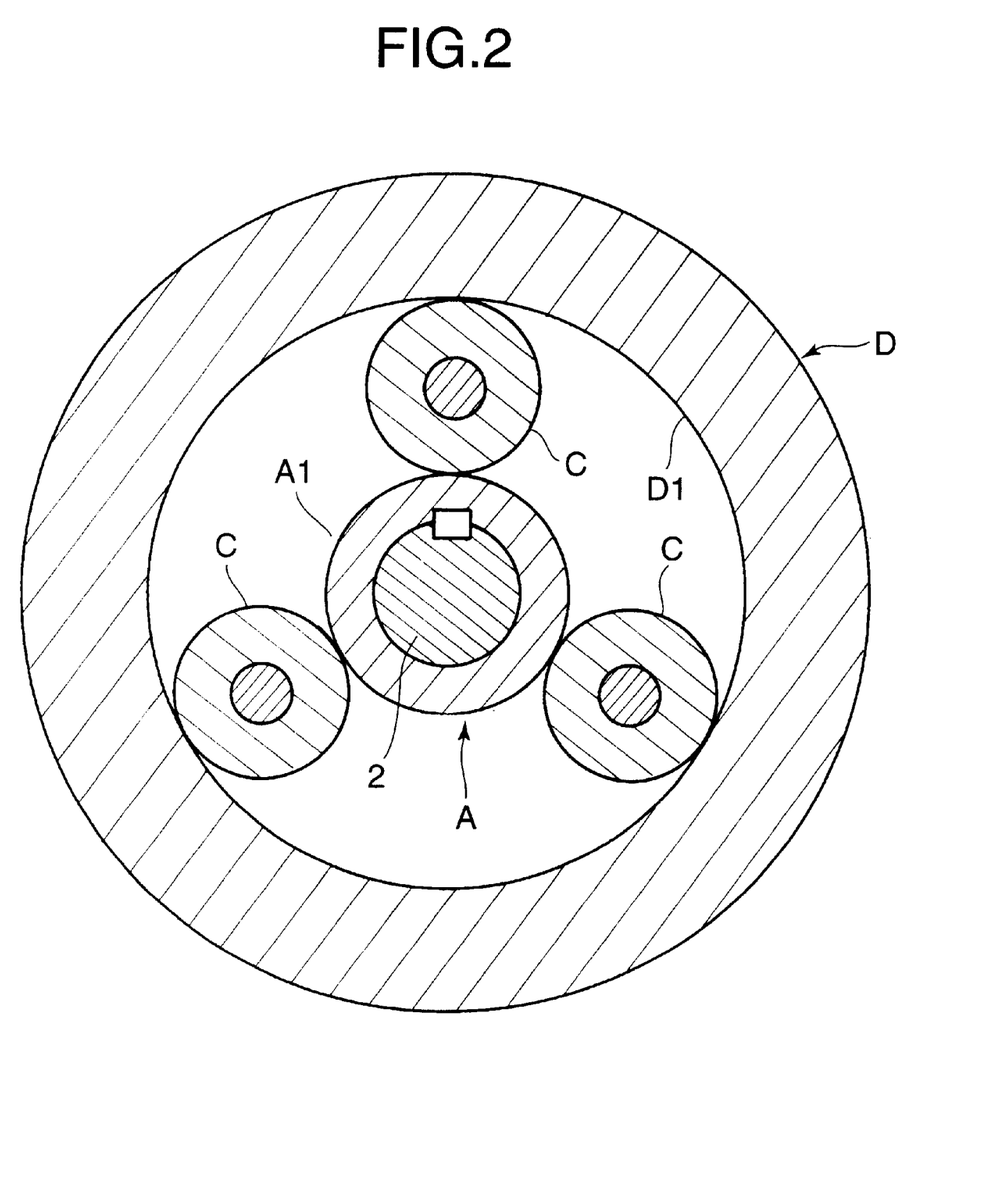
FIG. 2 is a sectional view taken along the line II—II of FIG. 1.
Figure 10:
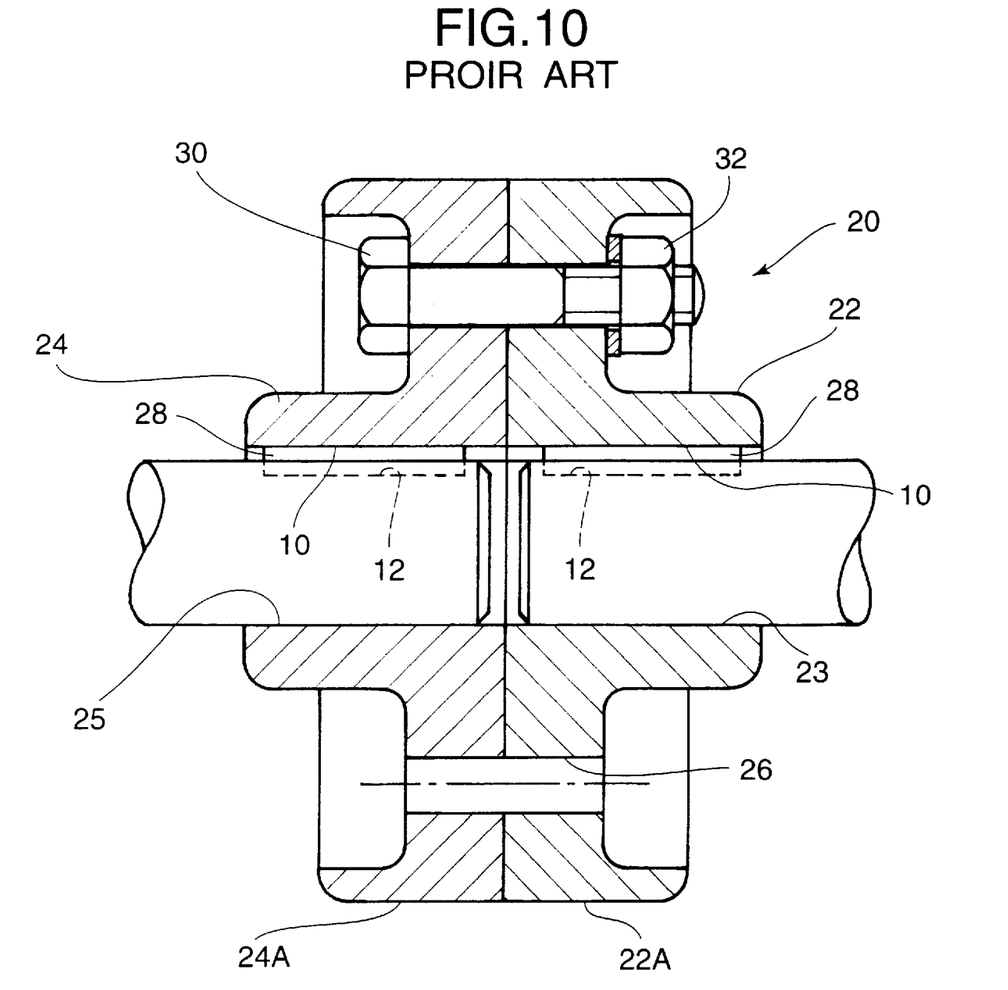
FIG. 10 is a partially sectional view showing another example of a conventional shaft coupling structure.

More specifically, as shown in FIGS. 1 and 2, a column-like member (as shown in FIGS. 9 and 10) is divided into a first-shaft-2 side and a second-shaft-4 side to form a first transmission member A and a second transmission member B for making integral rotations with the shafts (the first shaft 2 and the second shaft 4), respectively. A plurality of planetary rollers C are arranged around the first transmission member A so as to make rolling contact with the outer periphery A1 of the first transmission member A. Besides, a ring roller D with the inner periphery D1 of which the plurality of planetary rollers C make rolling contact is arranged so as to be restrained on rotation by an external non-rotational member F.

Moreover, each of the plurality of planetary rollers C is rotatably supported by a second transmission member B. As a result, the second transmission member B can make rotation integral with the revolution of the planetary rollers C around the first transmission member A.

In such configuration, the first transmission member A and the second transmission member B can be regarded as a sun roller and a carrier, respectively, which means that this shaft coupling structure also serves as a simple planetary roller mechanism using frictional rollers. Accordingly, given that the first transmission member A makes the input element of rotational power, the shaft coupling structure functions as a reduction mechanism with the second transmission member B as the output element. When the second transmission member B makes the input element of rotational power, the shaft coupling structure functions as a step-up mechanism with the first transmission member A as the output element.

In the meantime, this shaft coupling structure provided with speed change function loses none of the inherent shaft coupling functions despite the configuration as described above.

The reasons for this will be detailed below.

First, both the first transmission member A and the second transmission member B have a shaft insertion hole formed therein, and the first transmission member A and the second transmission member B are arranged on the same axis. This preserves the shaft coupling's essential function of "coupling the coaxially-opposed first and second shafts 2 and 4 to transmit rotational power."

Second, the rotational power is transmitted through the contact surfaces of the frictional rollers, i.e., of the planetary rollers C and the ring roller D. Therefore, the transmission produces no particularly high noise, preserving the property of "quietness" required of a shaft coupling.

Third, this shaft coupling structure with speed change function is configured so that the contact surfaces of the rollers make a slip when subjected to rotational torque above a predetermined value. Therefore, even if an overload suddenly occurs on one of the rotating shafts, a breakage of the apparatus connected to the other rotating shaft can be avoided to a certain extent. In other words, this shaft coupling structure also offers the function of "safety" required of a shaft coupling.

This shaft coupling structure with speed change function is somewhat greater in radial dimension due to the presence of the planetary rollers C and the ring roller D. This, however, means utilization of the space around a shaft coupling which has been wasted (not utilized) as stated before. Accordingly, the entire apparatus coupled will not be affected in size.

As is also evident from above, this shaft coupling structure with speed change function is provided with a high-ratio speed change function without losing the conventional shaft coupling functions. Therefore, when this shaft coupling structure is applied e.g. to couple a motor and speed change gears, it is possible to lower the gear ratio of the change gears to be coupled since the shaft coupling structure itself can achieve a certain change in speed. This makes the entire apparatus more compact.

The non-rotational member for restraining the rotation of the ring roller may come into engagement with and support the ring roller, and comprise a pair of flange portions spreading radially outward on the first and second transmission members, the flange portions being capable of establishing connection between a casing on the first-shaft side and a casing on the second-shaft side so that the rotation of the non-rotational member is restrained. In this case, the easy coupling between the first-shaft side and the second-shaft side can extend to the casings. In addition, the ring roller can be easily maintained in a non-rotational state.

Incidentally, FIG. 1 has shown, in functional terms, the ring roller D being engaged with an external non-rotational member for rotational restraint as fitted and fixed directly to the casing for accommodating this shaft structure. The means for the rotational restraint, however, is not limited thereto. For example, the ring roller D may be restrained on rotation by bolting, or by providing a projection on the ring roller D for engagement with the external non-rotational member. It is essential only that the rotation of the ring roller D be restrained in some way.

Moreover, the first and second transmission members A and B are not limited to certain specific configurations, and need not always have a column shape.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in detail with reference to the drawings.

Figure 3:
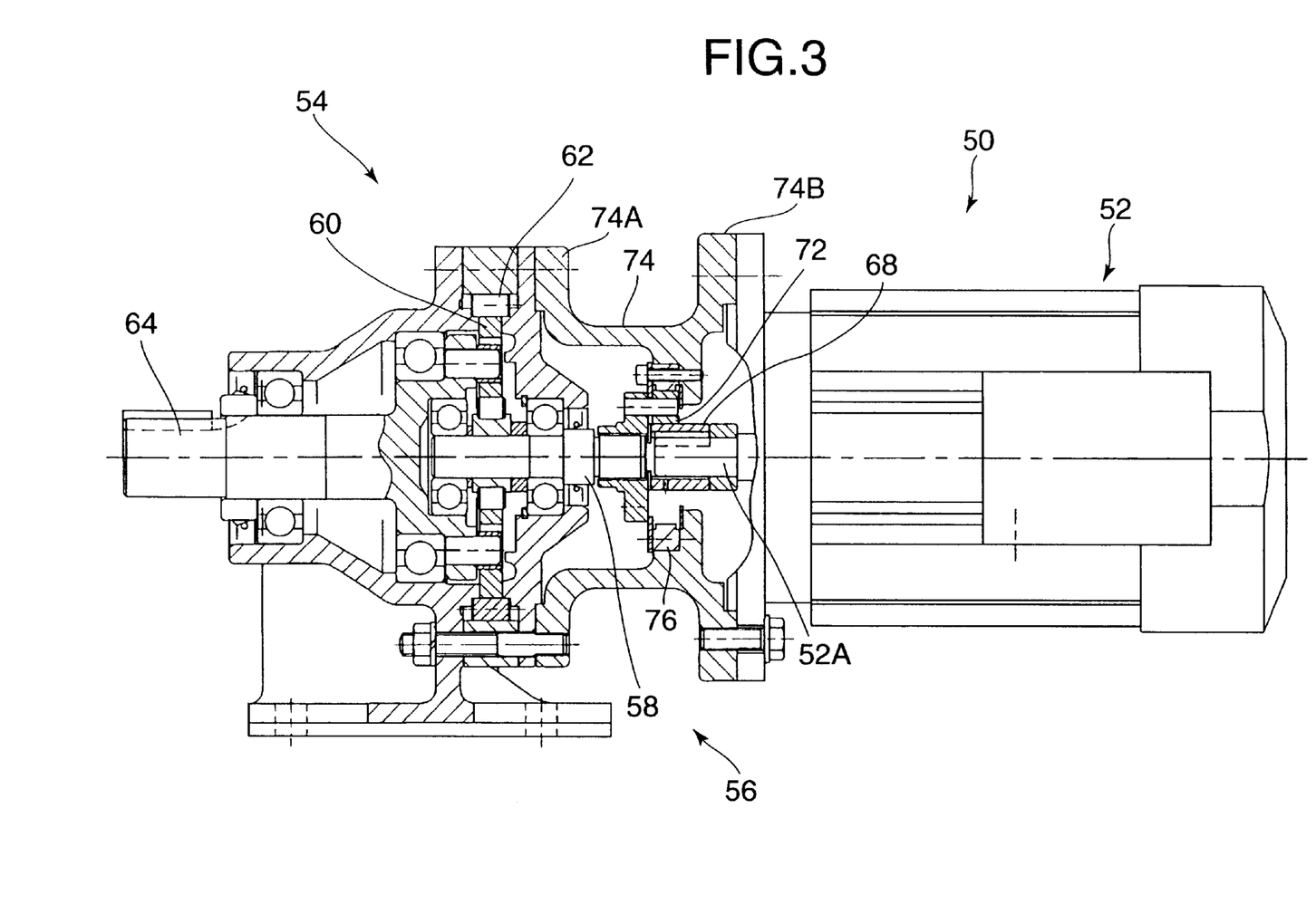
FIG. 3 is a partially sectional view of a geared motor to which a shaft coupling structure with speed change function according to a first embodiment of the present invention is applied.

FIG. 3 is a partially sectional view of a geared motor 50 to which a shaft coupling structure with speed change mechanism according to a first embodiment is applied. This geared motor 50 comprises: a motor unit 52 for generating rotational power; a reduction gear unit 54 containing an oscillating internal meshing gear reduction structure; and a coupling unit 56 for coupling this reduction gear unit 54 and the motor unit 52 to each other by using the shaft coupling structure according to the present invention.

The reduction gear unit 54 includes: an input shaft 58 to which rotational power is input; an external gear 60 supported by this input shaft 58so as to be capable of eccentric oscillating rotations; an internal gear 62 which is integrally formed on a casing 66 and with which the external gear 60 makes internal mesh; and an output shaft 64 for extracting and transmitting only the rotational component of the external gear 60 which makes rotation and revolution while making internal mesh with the internal gear 62.

Figure 4:
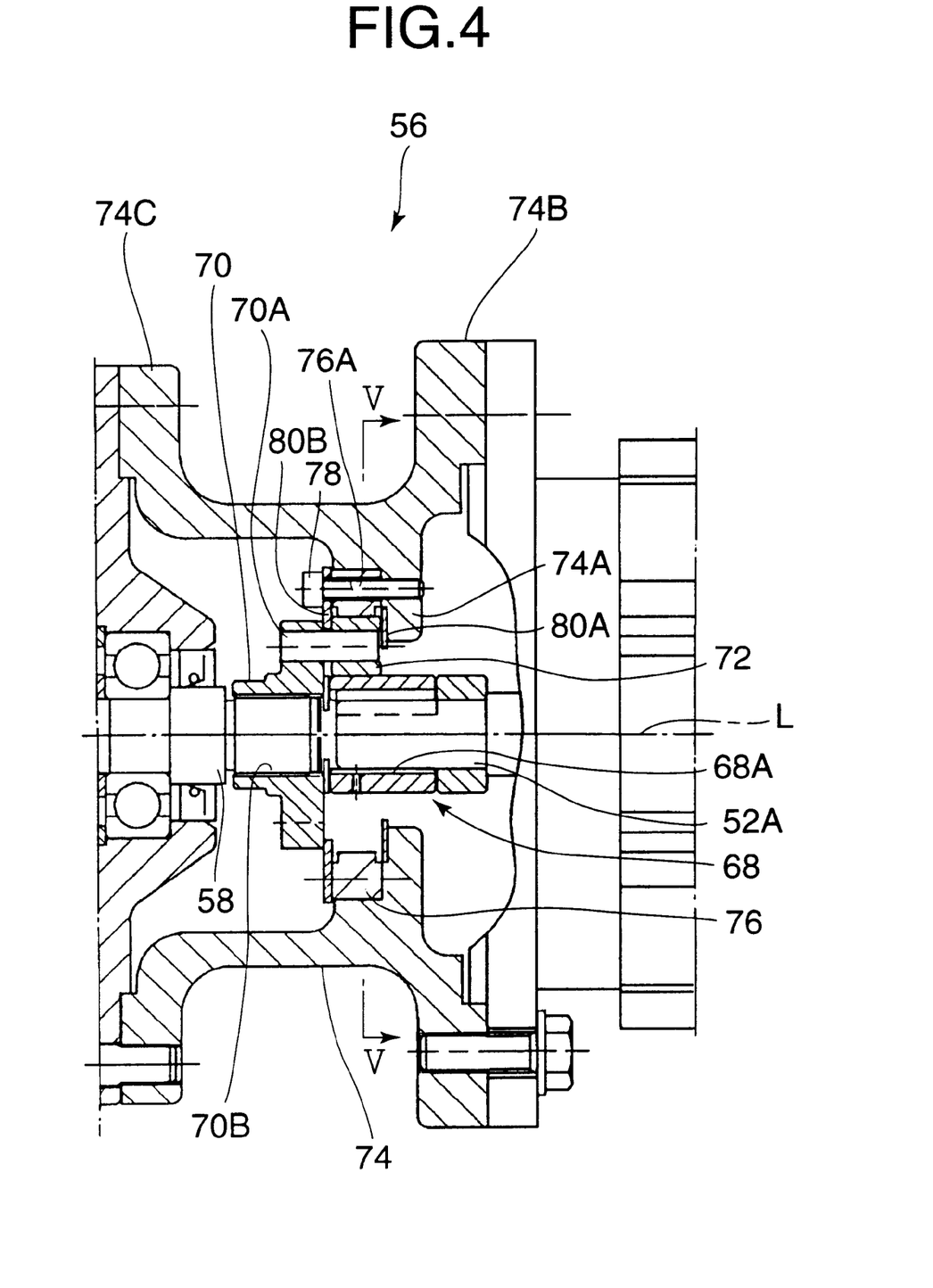
FIG. 4 is an enlarged sectional view of a coaxial coupling structure in the geared motor.
Figure 5:
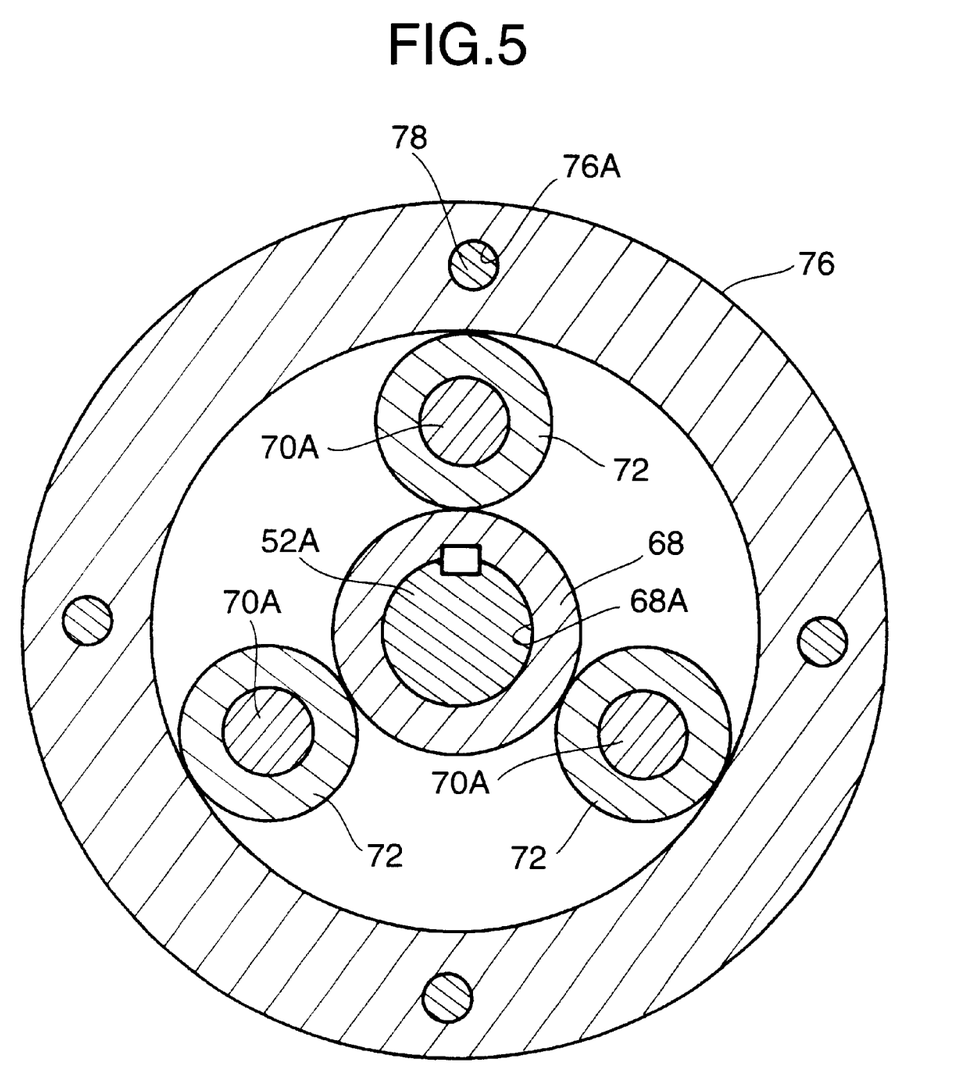
FIG. 5 is a sectional view taken along the line V—V of FIG. 4.

In the coupling unit 56, as magnified in FIGS. 4 and 5, a motor shaft 52A (corresponding to the first shaft 2 in FIG. 1) and an input shaft 58 (corresponding to the second shaft 4 in FIG. 1) are coaxially opposed to each other. The coupling unit 56 includes a first transmission member 68 for making integral rotation with the motor shaft 52A and a second transmission member 70 for making integral rotation with the input shaft 58.

Three planetary rollers 72 and a ring roller 76 are arranged around the first transmission member 68. The planetary rollers 72 make rolling contact with the outer periphery of the first transmission member 68 and with the inner periphery of the ring roller 76. The ring roller 76 is engaged with a casing (non-rotational member) 74 for rotational restraint.

The planetary rollers 72 are rotatably supported by the second transmission member 70. As a result, the second transmission member 70 makes rotation integral with the revolution of the planetary rollers 72 around the first transmission member 68.

To be more specific, the first transmission member 68 is provided with a shaft insertion hole 58 to which the motor shaft 52A can be inserted. The motor shaft 52A and the first transmission member 68 are engaged with each other in the direction of rotation by a key so as to make integral rotation. The second transmission member 70 is provided with a shaft insertion hole 70B to which the input shaft 58 can be inserted. The input shaft 58 and the second transmission member 70 are configured to make integral rotation via a spline connection.

While both the shaft insertion hole 68A in the first transmission member 68 and the shaft insertion hole 70B in the second transmission member 70 are formed through the respective transmission members 68 and 70, the present invention is not limited thereto. For example, each shaft insertion hole may be an "opening" that does not pass through completely.

The second transmission member 70 has three pins 70A extended in the direction of the center axis, at regular intervals along its circumferential direction. These pins 70A support the individual planetary rollers 72 rotatably. The ring roller 76 has bolt holes 76A formed therein at regular intervals along its circumferential direction. The ring roller 76 is directly fixed to a projection 74A of the casing 74 by bolts 78 inserted through the bolt holes 76.

In this connection, the reference numerals 80A and 80B represent planetary roller restraining members of ring shape, for restraining the axial movements of the planetary rollers 72. Of these, one (80B) is coaxially fixed to an end face of the ring roller 76 by the bolts 78, and the other (80A) is arranged in a depression in the casing 74.

The casing (non-rotational member) 74 for accommodating the shaft coupling structure with speed change function has a pair of flanges 74B and 74C integrally formed thereon. The flanges 74B and 74C spread radially outward at both sides of the first and second transmission members in the axial direction L. One flange portion 74B is integrally coupled to a motor flange 52B of the motor unit 52. The other flange portion 74C is integrally connected to the casing 66 of the reduction gear unit 54. In other words, via the flange portions 74B and 74C, the coupling unit 56 is coupled to the motor unit 52 and the reduction gear unit 54 while achieving the restraint on the rotation of its ring roller 76.

In this coupling unit 56, the first transmission member 68 is rotatively driven by the motor shaft 52A. The planetary rollers 72 interposed between the first transmission member 68 and the ring roller 76 make contact with the ring roller 76 for rotation while revolving around the first transmission member 68. As a result, the second transmission member 70 rotatably supporting the planetary rollers 72 extracts only the revolution of the planetary rollers 72, and transmits this revolution to the input shaft 58.

Accordingly, this coupling unit 56 combines the shaft coupling's basic function of transmitting the rotational power of the motor shaft 52A to the input shaft 58 with the change gears' function of rotating the input shaft 58 with respect to the motor shaft 52A at a certain change gear ratio.

In addition, as compared with the cases where an ordinary coupling (a coupling by which the motor shaft 52A and the input shaft 58 are coupled integrally) establishes the connection between the two shafts, the reduction gear unit 54 to be coupled may be made more compact because some of its speed change function can be shared with the coupling unit 56. In the meantime, the coupling unit 56 only utilizes the empty space (existing previously) between the reduction gear unit 54 and the motor unit 52, so that the entire geared motor 50 is hardly extended in the direction of the center axis L or enlarged in the radial direction.

Moreover, it has been confirmed from tests by the inventors that the coupling unit 56 can well absorb vibrations caused by the oscillations of the external gear 60 in the reduction gear unit 54, vibrations from the motor unit 52, and the like far beyond general expectations. Although unknown in detail, the reason for this seems that the coupling unit 56 transmits rotational power by means of friction between the contact surfaces of the planetary rollers 72, the ring roller 76, and the first transmission member 68, and that it has a characteristic transmission mode of utilizing the rotation and revolution of the planetary rollers 72. Furthermore, even if impact torque is applied to either of the input shaft 58 and the motor shaft 52A, the impact torque is absorbed into a slip between the contact surfaces of the rollers. This allows the coupling unit 56 to relieve some of the impact which can be transmitted to the other shaft, thereby preventing a breakage of the reduction gear unit 54 and the motor unit 52.

Now, referring to FIG. 6, description will be given of a rotary-machine driving apparatus 90 to which a shaft coupling structure with speed change function according to a second embodiment is applied.

In this driving apparatus 90, a motor unit 92 and a reduction gear unit 94 are coupled to each other via a shaft coupling structure with speed change function. To achieve this shaft coupling structure, a coupling unit 96 is interposed therebetween.

Figure 7:
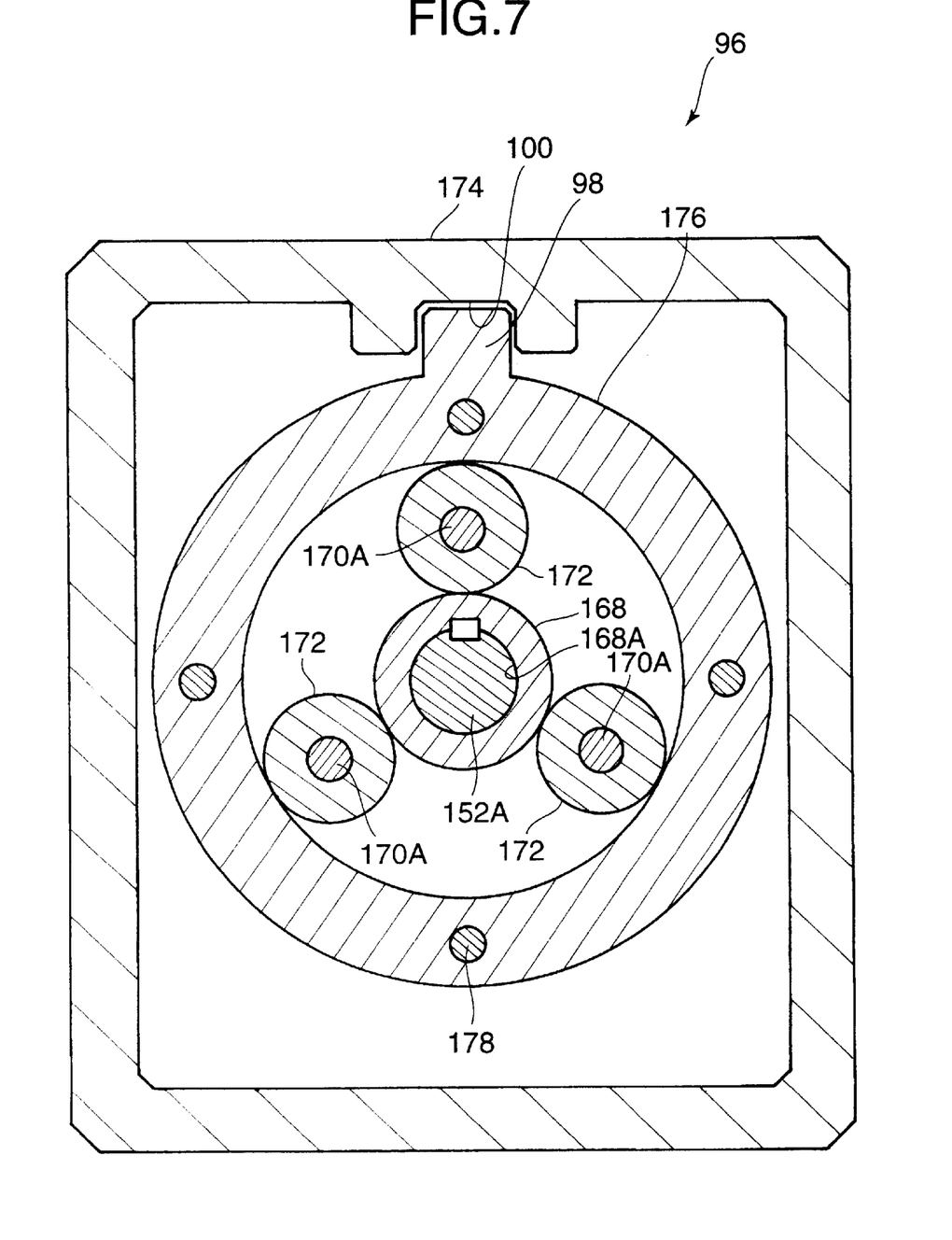
FIG. 7 is a sectional view taken along the line VII—VII of FIG. 6.

This coupling unit 96 is almost identical to the coupling unit 56 described in the first embodiment except in the means of fixing a ring roller 176, as shown in FIG. 7. Specifically, the ring roller 176 has an axial engage portion 98 projected radially outward from its outer periphery. On the other hand, a casing 174 has a recess 100, capable of engagement with the engage portion 98, formed on its inner periphery along the axial direction. Then, this recess 100 and the engage portion 98 are brought into engagement to restrain the rotation of the ring roller 176.

Figure 6:
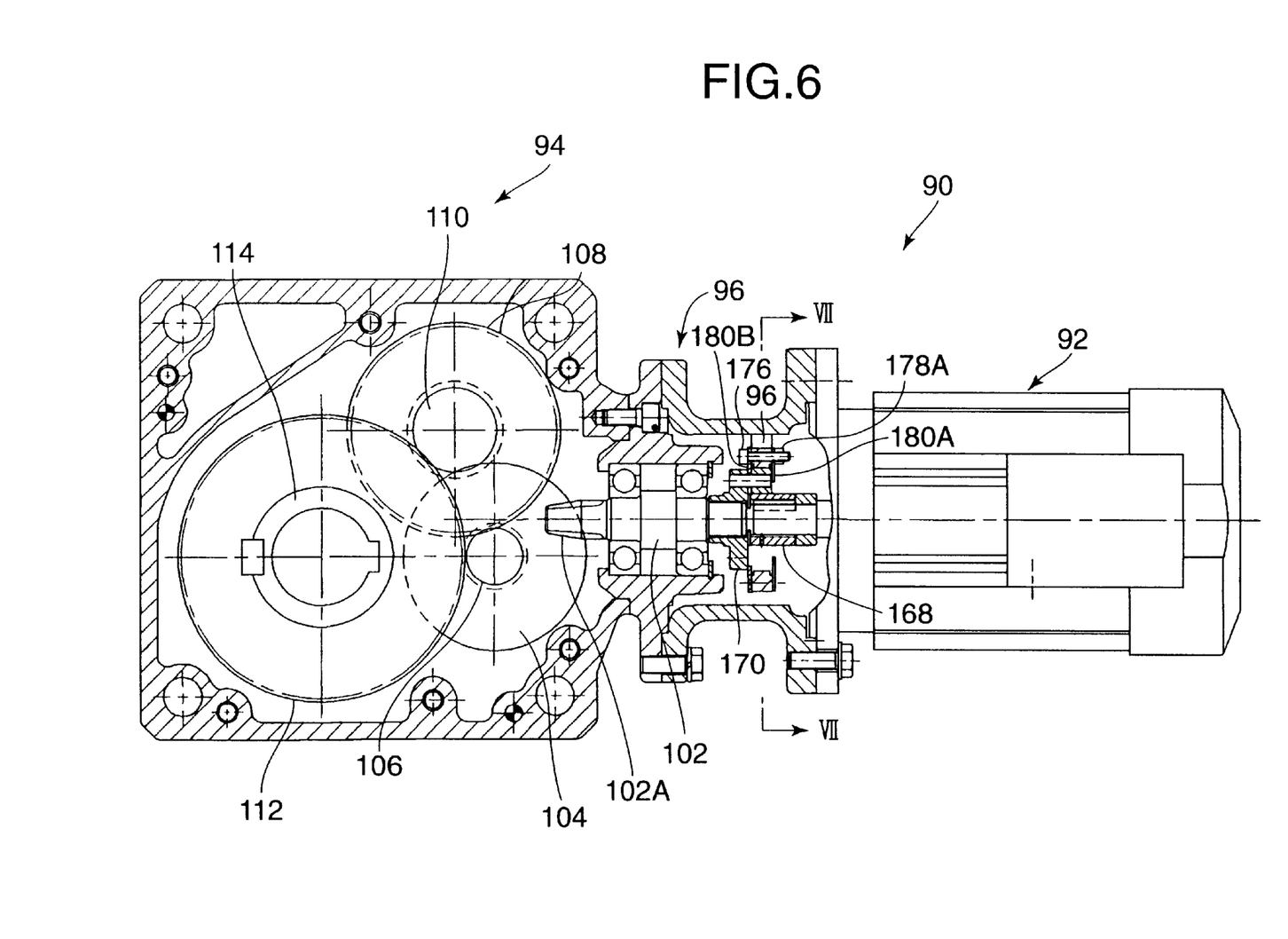
FIG. 6 is a partially sectional view of a rotary-machine driving apparatus to which a shaft coupling structure with speed change function according to a second embodiment of the present invention is applied.

Moreover, as the means of fixing the ring roller 176 are changed, planetary roller restraining members 180A and 180B for guiding planetary rollers 172 along the circumferential direction are coaxially fixed to both end faces of the ring roller 176 with bolts 178 and nuts 178A (see FIG. 6).

The other configuration of this coupling unit 96 is almost identical to that of the coupling unit 56 in the first embodiment. Therefore, identical or like parts will be designated by reference numerals having the same lower two digits as those employed in the coupling unit 56, and structural, functional, and other detailed descriptions thereof will be omitted.

The reduction gear unit 94 comprises: an input shaft 102 which is spline-connected to a second transmission member 170 at one end and has a hypoid pinion 102A integrally formed on the other end; a hypoid gear 104 meshing with the hypoid pinion 102A; a first pinion 106 for making coaxial, integral rotation with the hypoid gear 104; a first gear 108 meshing with the first pinion 106; a second pinion 110 for making coaxial, integral rotation with the first pinion 108; an output shaft gear 112 meshing with the second pinion 110; and an output shaft 114 of hollow type, piercing through the output shaft gear 112 at the center to support the output shaft gear 112.

Accordingly, rotational power from the motor unit 92 is transmitted through the coupling unit 96 to the input shaft 102 at a predetermined change gear ratio (reduction ratio). The rotational power on the input shaft 102 is transmitted through the individual pinions and gears in the reduction gear unit 94 to the output shaft 114 having an orthogonal rotation axis, at a predetermined reduction ratio.

In this coupling unit 96, the means of fixing the ring roller 176 has a simple structure of engaging the casing recess 100 and the engage portion 98 of the ring roller 176 with each other. Therefore, just a little modification to a joint casing in a conventional use allows the diversion of the joint casing thereto.

Incidentally, the first and second embodiments described above have dealt only with the cases where the shaft coupling structure with speed change function in a coupling unit offers a speed reducing function with the first transmission member as the input element and the second transmission member as the output element. Nevertheless, the present invention is not limited thereto, and is also applicable to a speed increasing function with the second transmission member as the input element and the first transmission member as the output element.

Figure 8:
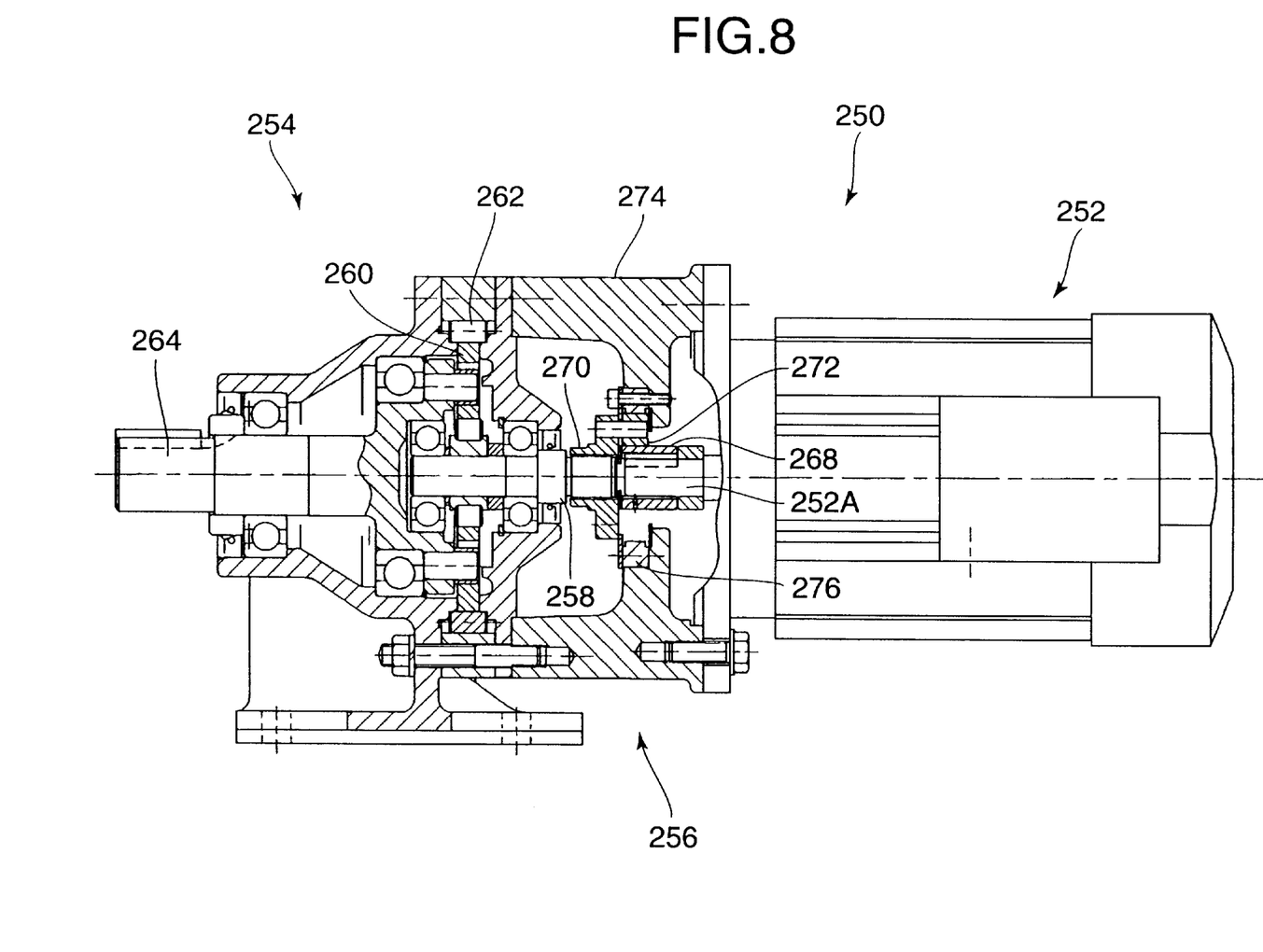
FIG. 8 is a partially sectional view showing another example of the geared motor to which a shaft coupling structure with speed change function according to an embodiment of the present invention is applied.

Moreover, the above-described embodiments have dealt with the cases where the casing (non-rotational member) of a coupling unit has a double-flange structure. However, the present invention is not limited thereto. For example, in a geared motor 250 shown in FIG. 8, both end faces of a casing 274 may be provided with (blind) bolt holes 274D instead of flanges. Here, the other configuration of the geared motor 250 is almost identical to that of the geared motor 50 shown in FIG. 3. Therefore, identical or like parts are designated by reference numerals having the same lower two digits as those employed in the geared motor 50, and structural, functional, and other detailed descriptions thereof will be omitted.

Furthermore, the above-described embodiments have dealt only with the cases where a coupling unit couples a motor unit and a reduction gear unit to each other. Nevertheless, the present invention is not limited thereto, and may be applied to every situation where coupling is established between two speed reducers, a speed reducer and a mating machine (any apparatus requiring rotational power), a motor and a mating machine, and the likes. In addition, the means of fixing a ring roller are not limited to those mentioned in the above-described embodiments. It is essential only that any form of engagement be established with a member not making integral rotation with the rotating shafts (including the casing and others) for rotational restraint.

According to the present invention, a shaft coupling structure can be obtained which is configured to maintain and exert the functions inherent to a shaft coupling structure, as well as to utilize the empty space around to-be-coupled two shafts for an additional speed change function.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A shaft coupling structure for coupling, comprising:
    a first shaft and a second shaft coaxially opposed to each other through a member having a first shaft hole and a second shaft hole, said first shaft and said second shaft being inserted into the first shaft hole and the second shaft hole respectively, rotational power transmission between said first shaft and said second shaft being effected by said member, wherein:
    said member is divided into a first-shaft side and a second-shaft side so as to form a first transmission member having the first shaft hole and a second transmission member having the second shaft hole, respectively;
    a plurality of planetary rollers and a ring roller are arranged around said first transmission member, said plurality of planetary rollers making rolling contact with the outer periphery of said first transmission member and with the inner periphery of said ring roller, said ring roller being engaged with a non-rotational member for rotational restraint; and
    said second transmission member supports said plurality of planetary rollers rotatably so that said second transmission member makes rotation integral with the revolution of said plurality of planetary rollers around said first transmission member.

2. The shaft coupling structure according to claim 1, wherein, said first shaft and said second shaft are supported by a first-shaft side casing and a second-shaft side casing respectively, and
    said non-rotational member is capable of establishing connection with at least one of the first-shaft side casing and the second-shaft side casing so as to be fixed.

3. The shaft coupling structure according to claim 2, wherein
    said non-rotational member fixedly supports an outer periphery of said ring roller, and comprises a pair of flange portions spreading radially outward on said first and second transmission members, said flange portions being capable of establishing connection between said first-shaft side casing and said second-shaft side casing so that the rotation of said non-rotational member is restrained.

4. The shaft coupling structure according to claims 2, wherein
    said second shaft is of an input shaft of a reduction gear unit, the input shaft having a spline, wherein
    a counter spline engaged with said spline of the input shaft is formed inside of said second shaft hole of the second transmission member, and
    the input shaft of the reduction gear unit and the second transmission member of the member are connected through the spline and center spline.

5. The shaft coupling structure according to claim 3, wherein said second shaft is of an input shaft of a reduction gear unit, the input shaft having a spline, wherein
    a counter spline engaged with said spline of the input shaft is formed inside of said second shaft hole of the second transmission member, and
    the input shaft of the reduction gear unit and the second transmission member of the member are connected through the spline and center spline.

6. The shaft coupling structure according to claim 1, wherein said second shaft is of an input shaft of a reduction gear unit, the input shaft having a spline, wherein
    a counter spline engaged with said spline of the input shaft is formed inside of said second shaft hole of the second transmission member, and
    the input shaft of the reduction gear unit and the second transmission member of the member are connected through the spline and center spline.

* * * * *